United States Patent [19]

Bianco et al.

[11] Patent Number: 5,411,337
[45] Date of Patent: May 2, 1995

[54] AXIALLY GUIDED LOCKING RING ASSEMBLY

[75] Inventors: Edward P. Bianco, Flatrock; Thomas A. Focht, Gibraltar; Howard Jackson, Taylor; Daniel L. DeCaminada, Romulus, all of Mich.

[73] Assignee: Anlock Products and Machine Co., South Rockwood, Mich.

[21] Appl. No.: 233,342

[22] Filed: Apr. 26, 1994

[51] Int. Cl.⁶ .............................................. F16C 19/06
[52] U.S. Cl. .................... 384/519; 384/542; 384/537; 384/540
[58] Field of Search ............... 384/519, 542, 537, 540, 384/517

[56] References Cited

U.S. PATENT DOCUMENTS

| Re. 33,490 | 12/1990 | Steinbock . |
|---|---|---|
| 1,393,610 | 10/1921 | Candee . |
| 1,938,402 | 12/1933 | Renner et al. . |
| 2,584,740 | 2/1952 | Reynolds . |
| 2,678,856 | 5/1954 | Chievitz . |
| 3,033,597 | 5/1962 | Miller . |
| 3,063,743 | 11/1962 | Kylen . |
| 3,304,139 | 2/1967 | Toth et al. . |
| 3,462,180 | 8/1969 | Bunyan . |
| 3,618,994 | 11/1971 | Gepfert . |
| 3,624,880 | 12/1971 | Justus et al. . |
| 3,945,234 | 3/1976 | Steinbock . |
| 4,012,154 | 3/1977 | Durwin et al. . |
| 4,104,995 | 8/1978 | Steinbock . |
| 4,136,989 | 1/1979 | Bianco . |
| 4,189,251 | 2/1980 | Bianco . |
| 4,200,407 | 4/1980 | Bianco . |
| 4,307,594 | 12/1981 | Steinbock . |
| 4,338,037 | 7/1982 | Deminski . |
| 4,622,730 | 11/1986 | Steinbock . |
| 4,846,614 | 7/1989 | Steinbock . |
| 4,923,323 | 5/1990 | Steinbock . |
| 5,075,950 | 12/1991 | Steinbock . |
| 5,083,889 | 1/1992 | Steinbock . |

FOREIGN PATENT DOCUMENTS 2088263  6/1982  United Kingdom .
349811  12/1972  U.S.S.R. .

*Primary Examiner*—Lenard A. Footland
*Attorney, Agent, or Firm*—Dykema Gossett

[57] ABSTRACT

A locking ring assembly retains a bearing to a shaft rotatably supported on a first axis of rotation. Guide pins extend axially from an annularly shaped bearing retainer slidably disposed on the shaft toward the pressure ring, also slidably on the shaft. A head of the guide pins is slidably disposed and captured in adjusting apertures of the pressure ring. Pressure screws in the adjusting apertures of the pressure ring translate axially in the apertures of the pressure ring when rotated, engaging the guide pin heads to displace the pressure ring from the bearing retainer. The pressure ring reacts against a reaction element disposed on the shaft opposite the bearing retainer to develop an axial thrust load against the bearing.

11 Claims, 2 Drawing Sheets

AXIALLY GUIDED LOCKING RING ASSEMBLY

TECHNICAL FIELD

The present invention relates generally to the bearing retainer art and more particularly to a bearing retainer or locking ring assembly suitable for retaining a bearing on a mill roll shaft or the like.

BACKGROUND OF THE INVENTION

Known locking ring assemblies are available in a wide variety of configurations. All typically have a portion or an element disposed in an annular groove of the shaft with an adjusting mechanism disposed between the groove and a bearing to be retained on the shaft. The bearing is typically pressed by the adjusting mechanism against a shoulder of the shaft.

Retaining bearings on mill roll shafts and the like is complicated by the large size of the associated components and the resultantly high axial thrust loads required to maintain bearings in their desired positions. The design of locking ring assemblies for mill roll shafts is further complicated by the dirty, harsh operating environment in which they are employed. The intrusion of dirt and contaminants into undesired locations within a locking ring assembly can potentially affect its ability to maintain the required thrust load against the bearing.

One well known design for an adjusting mechanism consists of a pressure ring disposed on the shaft between the bearing and a snap ring or similar travel limit means disposed in a groove around the shaft. A plurality of jack screws or Jack bolts threadingly engaging the pressure ring in a direction parallel to the axis of the shaft extend beyond the pressure ring to contact either the bearing or an intermediate member therebetween. Turning of the jack screws develops a compressive load against the bearing which reacts against the shaft shoulder. With each of the plurality of Jack screws fully torqued, a sufficiently high axial thrust load can be developed against the bearing.

In the case of adjusting mechanisms having Jack screws disposed directly against the bearing to be retained, there is a possiblity that even with relatively dirt free components, the pressure ring may be cocked during the tightening of the jack screws, particularly if the Jack screws are tightened one at a time, thereby producing an uneven load distribution against the bearing. Additionally, if there is any dirt present between an end of the jack screw and the bearing, the resultant thrust load between the bearing and the Jack screw will significantly deteriorate should any of the dirt trapped therebetween become displaced. Additionally, dirt collecting on the extended threads of the screws can potentially damage the threads on both the screws and pressure ring when the screws are loosened.

There is a need in the field of locking ring assemblies to provide an adjusting mechanism which is relatively insensitive to contamination in a dirty environment.

SUMMARY OF THE INVENTION

In one aspect of the present invention, a locking ring assembly for retaining a bearing to a shaft which is rotatably supported on a first axis of rotation is disclosed comprising a retaining ring, a pressure ring, a bearing retainer, and a plurality of guide pins. The retaining ring engages a circumferential slot in the shaft. A pressure ring is slidably located on the shaft between the retaining ring and a bearing. The pressure ring has a plurality of apertures parallel to the axis of rotation. Each aperture has a threaded portion and a non-threaded guide portion with the guide portion disposed toward the bearing. The bearing retainer is disposed between the pressure ring and the bearing and has a loading face on a first side of the bearing retainer for contacting the bearing. The guide pins are fixed to a second side of the bearing retainer and parallel the shaft axis. A first end of the pins has a head slidably disposed and captured in the guide portion of the aperture of the pressure ring. A plurality of pressure screws, one threaded in each of the threaded portion of the pressure ring apertures, engage the guide pins.

In another aspect of the present invention, the head of the guide pin has a radially extending flange.

Yet another aspect of the present invention includes a plurality of locking devices adapted to selectively engage the pressure screws, thereby resisting rotation.

The present invention employs guide pins extending from a bearing retainer. A head at a first end of the guide pins is entirely captured within corresponding apertures of the pressure ring, protecting it from environmental contaminants. The wear surfaces are hardened to provide maximum service life to moving and sliding components.

DETAILED DESCRIPTION OF THE PREFERRED EMBODIMENT

Figure 1:
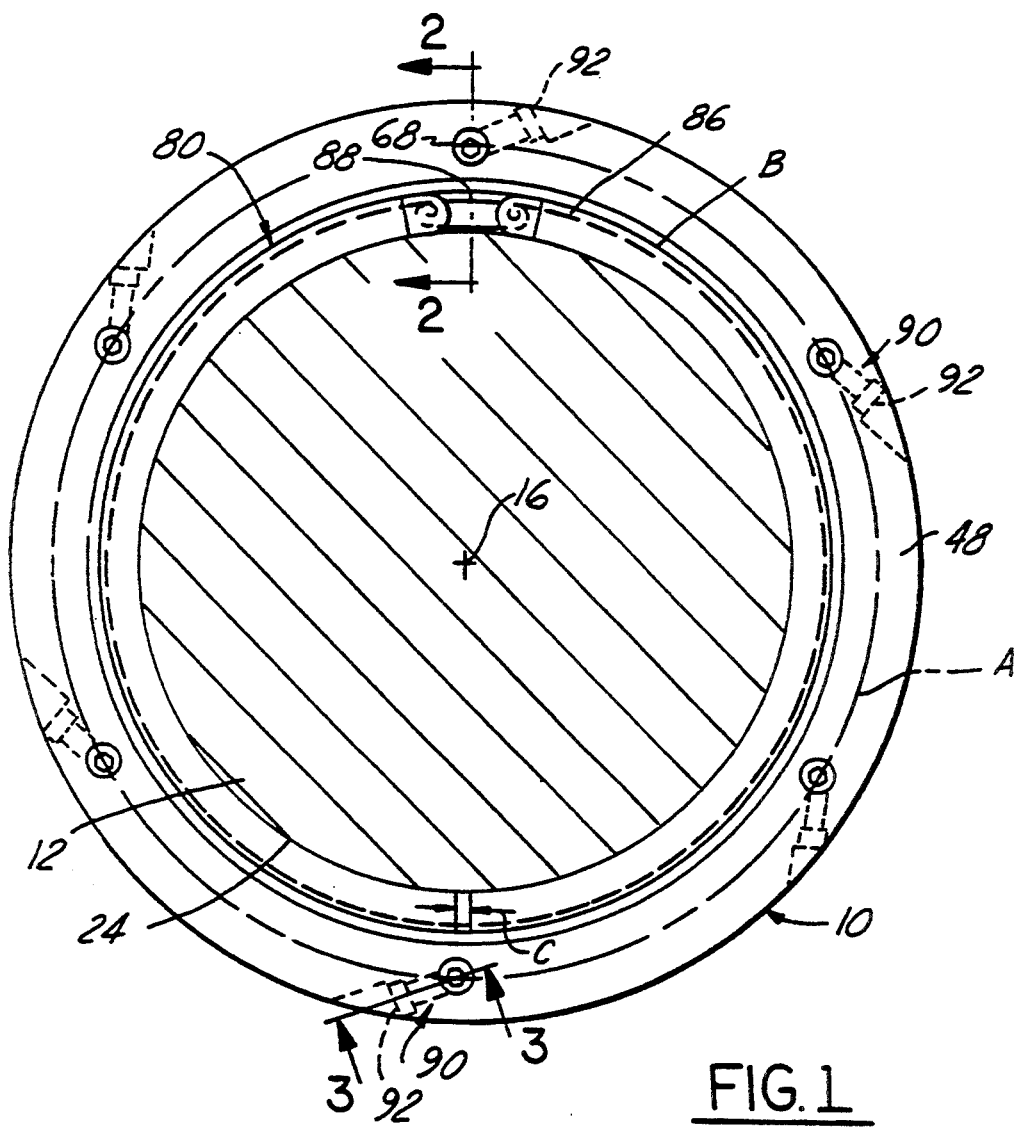
FIG. 1 is a sectional, axial end view of a mill roll shaft with a locking ring assembly mounted thereto.
Figure 3:
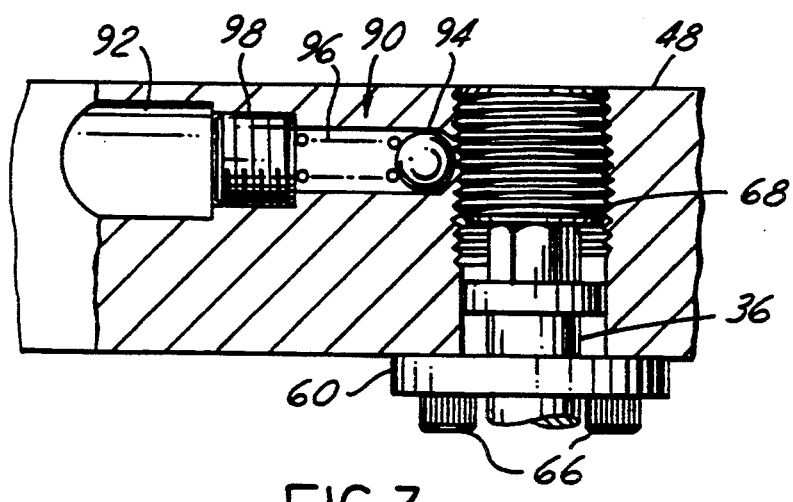
FIG. 3 is a sectional view in the direction of arrows 3 of FIG. 1 of a locking mechanism for the pressure screw of the locking ring assembly.
Figure 2:
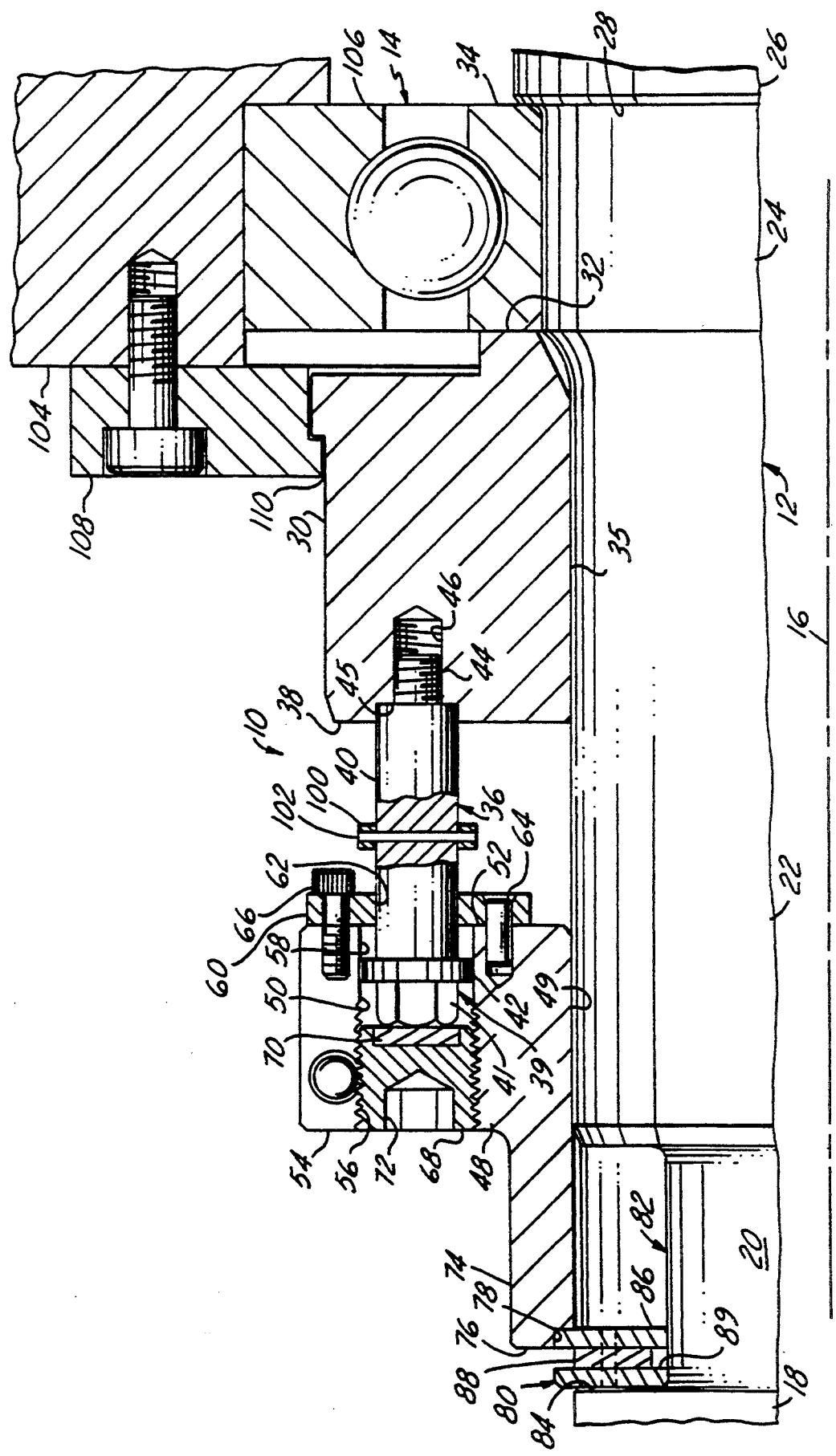
FIG. 2 is a diagramatic sectional view of the locking ring assembly in the direction of arrows 2 of FIG. 1.

FIGS. 1 and 2 show a locking ring assembly 10 disposed on a mill roll shaft 12. A bearing 14 is retained on the shaft 12 by the locking ring assembly 10. The shaft 12 is rotatably supported on a first axis of rotation 16. The shaft 12 has a plurality of cylindrical portions on which are disposed the locking ring assembly 10 and the bearing 14. A first cylindrical portion of the shaft 18 is a left-most portion of the shaft shown in FIG. 2. Moving to the right, the first cylindrical portion 18 is followed by a second cylindrical portion 20 smaller in diameter than the first cylindrical portion. A third cylindrical portion 22 to the immediate right of the second cylindrical portion 20 has a diameter at least as large as the first cylindrical portion 18. The fourth cylindrical portion 24, located to the immediate right of the third cylindrical portion 22, is shown with a diameter larger than the third cylindrical portion 22. The fifth cylindrical portion 26 immediately to the right of the fourth cylindrical portion 24 is shown as being larger in diameter than the fourth cylindrical portion.

The bearing 14 is disposed on the fourth cylindrical portion 24, and abuts a shoulder 28 of the fifth cylindrical portion 26. A bearing retainer 30 has a loading face 32 on a first side disposed against the bearing 14. The loading face 32 is configured so as to contact an inner race 34 of the bearing 14 and yet avoid contact with the fifth cylindrical portion 26. The inner race 34 of the bearing 14 is press-fit over the fourth cylindrical portion 24. The bearing retainer 30 has an opening 35 sized to provide a clearance fit over the third cylindrical portion 22.

A plurality of guide pins 36 project from the bearing retainer 30 parallel to the axis 16 from a first side 38 opposite the loading face 32. In the present embodiment, six guide pins 36 are evenly spaced from each other on a constant diameter bolt circle A. The guide pins 36 have an elongated cylindrical shank portion 40 of constant diameter. A first end or head 39 of the guide pin 36 has a hex head 41 and radially extending flange 42 larger in diameter than the cylindrical shank portion 40. A second end of the guide pin 36 has an axially extending threaded stud 44. The guide pins 36 are received by recessed countersunk bores 45 with threaded apertures. The counter bores 45 provide a very close clearance fit with respect to the shank portion of the pins 36. The guide pins 36 are fixed to the bearing retainer 30 by threading the studs 44 into the threaded apertures 46 in the bearing retainer 30 on the bolt circle A. A torque sufficient to effectively fix the guide pins 36 to the bearing retainer 30 is applied to the hex head 41.

A pressure ring 48 is disposed in part over the third cylindrical portion of the shaft 22 and also in part over the second cylindrical portion of the shaft 20. A primary opening 49 in the pressure ring is sized to provide a clearance fit over the third cylindrical portion 22 of the shaft 12. The clearance fit allows for relative sliding motion between the pressure ring 48 and the shaft 12.

The pressure ring 48 has a plurality, six in this exemplary embodiment, of pressure ring, or adjusting apertures 50 evenly spaced on a bolt circle equal in diameter to bolt circle A and concentric therewith. The apertures 50 are parallel to the axis of rotation 16. A first side 52 of the pressure ring 48 is disposed toward the second side 38 of the bearing retainer 30. A second side 54 of the pressure ring 48 is disposed opposite the first side 52.

The adjusting apertures 50 pass from the first side of the pressure ring through the second side of the pressure ring 54. The adjusting apertures 50 have a threaded portion 56 extending from the second side 54 to a point approximately mid-way between the first side 52 and the second side 54. A guide portion 58 of the apertures 50 is disposed between the threaded portion 56 and the first side of the pressure ring 52. The guide portion 58 is of a constant diameter sized to provide a slidable piloting relationship with the flange 42 of the guide pin 36.

A plurality of guide pin retainers 60 are fixed to the first side 52 of the pressure ring 48 over each of the adjusting apertures 50. Each of the guide pin retainers are annular in shape. A central aperture 62 of each retainer 60 is aligned with the adjusting apertures 50, and is sized to provide a slidable piloting relationship with the shank portion 40 of the guide pins. The sliding relationship of the flange 42 to the guide portion 58, together with the sliding relationship between the retainer's primary aperture 62 and the cylindrical shank portion of the guide pin 36, maintains the pressure ring 48 coaxial with the bearing retainer 30. The guide pin retainers 60 are made of hardened steel to minimize potential wear, providing longer service life without appreciable deterioration of alignment accuracy. Each guide pin retainer 60 is located on the pressure ring 48 by a pair of dowel pins 64. Four socket head screws are used to fix each guide pin retainer 60 to the first side 52 of the pressure ring 48. It should be appreciated that the function of the guide pin retainer 60 can be integrated into the pressure ring 48 by providing a blind bore therein from the second side 54 and providing a hole through the first side 52 equal in diameter to the primary aperture 62.

A pressure screw 68 is threadingly disposed in the threaded portion 56 of the adjusting aperture 50. The pressure screw 68 has a length such that it is approximately flush with the second side 54 of the pressure ring 48 when fully installed. A disk shaped thrust button 70 is retained in a cavity of complimentary shape in the pressure screw 68 on a side disposed toward the first end of the guide pin 36. The thrust button 70 is formed from a material softer than that used for the first end of the guide pin 36. A hex socket 72 is formed in an end of the pressure screw 68 opposite the thrust button 70 to accommodate a hex shaped drive tool. A axially extending flange 74 provides an axial extension of the second side 54 of the pressure ring 48. At an end 76 of the flange 74, there is a circumferential notch or undercut 78 inside the primary opening 49.

The combination of the pressure ring 48 with the pressure screws 68 and guide pin retainers 60 provide an adjusting mechanism capable of producing relative displacement between the pressure ring 48 and the bearing retainer 30.

A retaining ring 80 is disposed in a circumferential groove 82 in the shaft 12, forming the second cylindrical portion 20 and a shoulder 84 of the first cylindrical portion 18. The retaining ring 80 has two arcuate members 86 pivotally linked to each other by an intermediate link member 88. The link member 88 is disposed on each end in a slot 89 of the arcuate members. Pins passing through the arcuate members 86 and the link member 88 allow relative pivoting therebetween. When the retaining ring 80 is disposed in the slot 82, an inside surface of the arcuate members 86 contacts the second cylindrical portion 20 of the shaft 12, thereby defining a retaining ring outside diameter B. The arcuate members 86 have lengths such that when the retaining ring 80 is disposed in the groove 82 there is a gap C between the arcuate members 86. The notch 78 in the end 76 of the flange 74 has a diameter greater than B, enabling it to surround the retaining ring.

It is to be appreciated that other means for axially engaging the shaft 12 can be employed. Any ring type element disposed in the groove 82 would suffice to provide a reaction element for the end 76 of the pressure ring 48, either with or without the notch 78.

A screw lock assembly 90 is also disposed in the pressure ring. A lock aperture 92 is provided in the pressure ring 48 normal to each pressure screw 68. The screw lock assembly 90 includes a steel ball 94, a spring 96, and a set screw 98. The ball 94 is disposed in the lock aperture against the pressure screw 68. The spring 96 is disposed against the steel ball in the lock aperture 92 and is retained therein by the set screw 98 which threadingly engages a threaded portion of the lock aperture 92. Tightening of the set screw 98 increases the force from the spring 96 against the steel ball 94, thereby increasing the torque required to turn the pressure screw. The screw lock assembly 90 thus maintains the position of the pressure screw 98 in the threaded portion 56 of the adjusting aperture 50.

A stop collar 100 is disposed over the shank portion 40 of the guide pins 36, and is axially located between the guide pin retainer 60 and the bearing retainer 30. A retainer pin 102 is disposed in aligned apertures through the collar 100 and pin 36 to hold the collar 100 in place on the guide pin 36. Examples of suitable retainer pins 102 are spring pins and roll pins.

A bearing chock 104 of the mill is disposed over an outer race 106 of the bearing 14. A seal plate 108 is fixed to the bearing chock 104 and together with the retainer 30 forms a labyrinth seal 110.

The locking ring assembly 10 is installed on the mill roll shaft 12 as follows. A guide pin retainer 60 is slipped over the shank portion 40 of each of the guide pins 36. A stop collar 100 is then slipped over the shank portion 40 and the aperture therein aligned with the corresponding aperture in the guide pin 36. The retainer pin 102 is then pressed into the aligned apertures to couple the collar 100 with the guide pin 36. Assembled guide pins 36 and retainers 60 are aligned with each of the adjusting apertures 50 with the flanges 42 disposed therein. Dowel pins 64 are installed to position the retainers 60 relative to the adjusting apertures 50. The socket head screws 66 are then installed to fix the guide pin retainers 60 to the first side 52 of the pressure ring 48.

The bearing retainer 30 is then slipped over the mill roll shaft 12 with its loading face 32 disposed towards the bearing 14. The seal plate 108 is slipped over the retainer 30 and fixed to the bearing chock 104. The labyrinth seal 110 formed between the seal plate 108 and the retainer 30 substantially prevents dirt and contaminants from reaching the bearing 14. The pressure ring 48 is next slipped over the mill roll shaft with the extending guide pins 36 directed toward the bearing retainer 30. The pressure ring 48 is pushed toward the bearing retainer 30. The primary apertures 62 are aligned with the counterbores 45 and threaded apertures 46 in the bearing retainer 30. Each of the axially extending threaded studs 44 of the guide pins 36 are threaded into the threaded apertures 46 in the bearing retainer 30 with the shank portion 40 seating against a bottom of the counterbore 45. The guide pins 36 are tightened through the hex heads 41 to a predetermined torque level to prevent their loosening. Thrust buttons 70 are pressed into the cavities of the pressure screws 68. The pressure screws 68 are threaded into the threaded portion 56 of the adjusting apertures 50, capturing the heads 39 of the guide pins 36. The steel balls 94 are deposited one by one in each of the lock apertures 92 and backed up by the springs 96 and set screws 98 also installed in the lock apertures 92.

The retaining ring 80 is slipped into the groove 82, over the second cylindrical portion 20. The pressure screws 68 are then turned so as to axially displace them toward and into contact with the heads 39, resultantly pushing the pressure ring 48 away from the bearing retainer 30. The notch 78 in the pressure ring flange 74 gradually entraps a portion of the retaining ring 80 on its outside diameter. As tightening of the pressure screws continues, force increases between the retaining ring 80 and the bearing 14 with the bearing 14 reacting against the shoulder 28 of the fifth cylindrical portion 26. Throughout the travel of the pressure screws, the guide pins 36 are maintained in an axial orientation by the cooperation of the guide pin flanges 42 with the guide portions 58, and the primary apertures 62 with the cylindrical shank portions 40. Additional protection against cocking of the pressure ring 48 during tightening of the pressure screws 68 is provided by the stop collars 100 which limit axial travel of the pressure ring 48 relative to the bearing retainer 30. The desired level of thrust load against the bearing 14 is then developed by the adjusting of the pressure screws 68 acting against the guide pins 36. When the pressure screws 68 are fully installed, they are flush with the second side 54 of the pressure ring 48, leaving none of the threads of the screws 68 or the adjusting apertures 50 exposed to contaminants such as airborne grit. The set screws 98 of the screw lock assemblies 90 are tightened to prevent any loss of thrust load against the bearing 14 during operation of the mill. The pressure screws 68 are prevented form backing out or loosening by the pressure exerted on them by the lock assembly 90.

The force applied against each pressure screw 68 by the steel ball 94 is variable, depending on the amount the spring 96 is compressed by the set screw 98. The set screws 98 can of course be partially unthreaded to reduce the force against the pressure screws 68 to allow their adjustment. After adjusting the pressure screws 68, the set screws 98 can be retightened against the springs 96 to relock the pressure screws 68.

With the interface between the pressure screw 68 and the head 39 of the guide pin 36 being effectively sealed off and protected from contaminants within the adjusting aperture 50, a highly reliable and sustainable bearing retainer load is achieved with the present locking ring assembly.

It should be appreciated that the mill roll shaft 12, when worn, can be removed and replaced with a new shaft 12 without removing the bearing or the locking ring assembly 10 from the mill. The bearing 14 and the locking ring assembly 10 are retained by the bearing chock 104 and the seal plate 108. Only the retaining ring 80 need be removed to allow the shaft 12 to be pulled.

Other aspects, objects, and advantages of this invention can be obtained from a study of the drawings, the disclosure, and the appended claims.

I claim:

1. A locking ring assembly for retaining a bearing to a shaft rotatably supported on a first axis of rotation comprising:

a bearing retainer of annular shape slidably disposed over the shaft having a loading face on a first side disposed toward the bearing and an oppositely facing second side;

a pressure ring of annular shape slidably disposed over the shaft having a first side disposed toward the bearing retainer and an oppositely facing second side and defining a plurality of adjusting apertures parallel to the axis of rotation, the apertures having a threaded portion between the second side of the pressure ring and a point between the first side and the second side and a substantially smooth guide portion between the threaded portion and the first side of the pressure ring;

a plurality of guide pins fixedly projecting from a second side of the bearing retainer opposite the first side and parallel to the shaft axis with a head at a first end slidably disposed and captured within the guide portion of the adjusting apertures;

a reaction means fixed to the shaft on the second side of the pressure ring thereby limiting axial translation of the pressure ring along the shaft away from the bearing and bearing retainer;

a plurality of pressure screws, threadingly disposed in the threaded portion of the adjusting apertures thereby entirely enclosing the heads of the guide pins within the adjusting apertures and protecting the head and smooth guide portion from contamination by dirt wherein turning of the screws to engage the guide pin produces axial displacement of the pressure ring relative to the bearing retainer and a compressive force therebetween when the pressure ring engages the reaction means.

2. A locking ring assembly as claimed in claim 1 wherein the reaction means comprises a reaction ring disposed in a circumferential groove in the shaft, the reaction ring having two arcuate members pivotally linked to each other adapted to engage the circumferential groove in the shaft and defining a reaction ring outside diameter when disposed in the groove.

3. A locking ring assembly as claimed in claim 2, wherein the arcuate members are free at ends opposite the pivotal attachment and define a gap between the free ends when disposed in the groove.

4. A locking ring assembly as claimed in claim 1 wherein the guide pin heads have a radially extending flange.

5. A locking ring assembly as claimed in claim 3 further comprising a plurality of guide pin retainers, each defining an aperture providing a piloting relationship with a shank of the guide pin between the head and the bearing retainer and fixed to the first side of the pressure ring with the aperture aligned with the pressure ring.

6. A locking ring assembly as claimed in claim 1, further comprising a plurality of set screw units in the pressure ring, wherein locking members of the set screw units are forced against the threads of the pressure screw thereby increasing a resistance of the pressure screw to turning.

7. A locking ring assembly as claimed in claim 1, further comprising a plurality of thrust buttons, one disposed in a cavity in each of the pressure screws for disposition against the guide pin heads and being formed of material softer than the guide pins to prevent upsetting of the guide pin heads.

8. A locking ring assembly as claimed in claim 1, further comprising a stop collar fixed to each guide pin and limiting travel therealong of the pressure ring.

9. A locking ring assembly as claimed in claim 1, wherein the pressure screws are flush with the second side of the pressure ring when screws are threaded into the adjusting apertures to a depth producing a compressive force between the pressure ring and the reaction means.

10. A locking ring assembly as claimed in claim 1, further comprising a bearing chock fixed to a mill and circumscribing and trapping the bearing wherein both the bearing and the locking ring assembly are retained in position relative to the mill when the shaft is removed from the mill.

11. A locking ring assembly for retaining a bearing to a shaft rotatably supported on a first axis of rotation comprising:
a bearing retainer slidably disposed over a first cylindrical portion of the shaft and having a loading face on a first side of the bearing retainer for contacting the bearing and an oppositely facing second side;
a pressure ring being annularly shaped, defining a primary opening sized to provide a clearance fit over the first cylindrical portion of the shaft, having a first side disposed toward the bearing retainer and an oppositely facing second side and defining a plurality of axially oriented adjusting apertures, the adjusting apertures threaded from the second side of the pressure ring to a point between the first side and the second side, a guide portion of the adjusting apertures being between the threads and the first side of the pressure ring;
a plurality of guide pins axially extending from the second side of the bearing retainer, at least one having a radially extending flange on a first end slidably disposed within the guide portion of the pressure ring;
retaining means for retaining the guide pin flanges within the guide portion of the pressure ring apertures being disposed over the pressure ring apertures on the first side of the pressure ring;
a reaction element disposed in a circumferential groove in the shaft on a side of the pressure ring opposite the bearing retainer; and
a plurality of headless pressure screws, disposed within the threaded portion of the apertures in the pressure ring, for engaging the guide pins.

* * * * *